(12) United States Patent
Kissel, Jr.

(10) Patent No.: US 9,004,009 B2
(45) Date of Patent: Apr. 14, 2015

(54) ROTARY PET BRUSH

(75) Inventor: Waldemar F. Kissel, Jr., Gainesville, FL (US)

(73) Assignee: WFK & Associates, LLC, Gainesville, FL (US)

( * ) Notice: Subject to any disclaimer, the term of this patent is extended or adjusted under 35 U.S.C. 154(b) by 465 days.

(21) Appl. No.: 13/015,162

(22) Filed: Jan. 27, 2011

(65) Prior Publication Data

US 2011/0180013 A1    Jul. 28, 2011

Related U.S. Application Data

(60) Provisional application No. 61/298,707, filed on Jan. 27, 2010.

(51) Int. Cl.
*A01K 13/00* (2006.01)
*A46B 13/00* (2006.01)
*A46B 13/02* (2006.01)
*A46D 1/00* (2006.01)

(52) U.S. Cl.
CPC .............. *A01K 13/002* (2013.01); *A46B 13/005* (2013.01); *A46B 13/02* (2013.01); *A46B 2200/1093* (2013.01); *A46D 1/00* (2013.01); *A46D 1/0253* (2013.01); *A46D 1/0284* (2013.01)

(58) Field of Classification Search
CPC ............................... A01K 13/00; A01K 13/02

USPC .................................................. 119/600–633
See application file for complete search history.

(56) References Cited

U.S. PATENT DOCUMENTS

| | | | | | |
|---|---|---|---|---|---|
| 1,671,334 | A | * | 5/1928 | White | 15/202 |
| 2,238,603 | A | * | 4/1941 | Runnels | 132/120 |
| 4,084,282 | A | * | 4/1978 | Calvert | 15/38 |
| 5,337,765 | A | * | 8/1994 | Wong | 132/120 |
| 6,082,307 | A | * | 7/2000 | Landreneau | 119/616 |
| 8,060,967 | B1 | * | 11/2011 | Johnson, Jr. | 15/23 |
| 8,132,541 | B1 | * | 3/2012 | Baer, Jr. | 119/664 |
| 2007/0169720 | A1 | * | 7/2007 | Roy | 119/615 |
| 2011/0174234 | A1 | * | 7/2011 | Friberg et al. | 119/609 |

* cited by examiner

*Primary Examiner* — Monica Williams
*Assistant Examiner* — Joshua Huson
(74) *Attorney, Agent, or Firm* — GrayRobinson P.A.; Michael J. Colitz, III (57) ABSTRACT

Disclosed is a rotary brush for use in grooming a pet, such as a dog or cat. The brush includes a handle to which a head is rotatably mounted. The head preferably includes a series of channels that accepted elongated rows of tines. The tines can be formed in any of a variety of shapes or arrangements to facilitate proper grooming. A skin guard can also be included to prevent the tines from damaging the pet's skin. An accumulator is secured to the handle and is interdigitated with the series of upstanding tines. In this manner, the accumulator collects hair gathered by the tines.

13 Claims, 13 Drawing Sheets

ROTARY PET BRUSH

RELATED APPLICATION DATA

This application claims priority from provisional application Ser. No. 61/298,707 filed on Jan. 27, 2010 and entitled Canine Pet Brush. The contents of this application are fully incorporated herein by reference.

BACKGROUND OF THE INVENTION

1. Field of the Invention

This disclosure relates to a pet brush. More specifically, the disclosure relates to a rotary pet brush with tines that are interchangable and that are designed to avoid harming the skin of the pet being groomed.

2. Description of the Background Art

There are numerous brushes and combs available for brushing animal fur (dogs, cats, horses, etc.) as well as human hair. Each brush has a different design of tines and bristles each serving a different purpose. These brushes are operated manually and get clogged with loose fur or hair during brushing. The manual brushing becomes a laborious process. The continuous clogging of the brush reduces the efficiency and effectiveness of the process.

Each brush or comb serves a different purpose, so the brushing must be done in several stages. First brush or comb may remove loose fur, second brush may reduce tangles, third brush may be a slicker, a fourth brush may add a sheen to the coat. The continuous clogging of brushes requires repeated manual removal of the accumulated hair/fur. In addition some tine shapes of the brush may scrape or even dig into the skin. In the brushing process the brush stroke may move with the grain of fur from head to tail or it may move against the grain of fur from tail to head. In either case the brush is gliding over the top surface of the fur and is not getting down to the skin surface of the pet. This is not an efficient or very effective procedure. Prior art brushes are used as a means to remove loose hair, straighten hair, remove tangles, and shape it into a preferred style so a hair spray or gel may be applied to hold the hair in place.

SUMMARY OF THE INVENTION

It is a primary objective of this invention to reduce the manual effort, toil and take some tedium out of the process of brushing fur or hair. Grooming an animal can wear out the arm muscles before the job is complete.

It is an objective of this invention to increase the versatility of the electric powered crawler by providing interchangeable heads with heads designed for various crawling applications.

It is a further objective of this invention to eliminate the need for multiple crawls by using fluted crawler heads with interchangeable channel strips. The channel strips shall have a variety of tines and the channel strips themselves may be assembled from an assortment of tines or channel strips. Thus allowing one crawler head to perform multiple functions simultaneously as it crawls the fur.

It is an objective of this invention that crawler heads, drums or sleeve may be custom assembled for the purpose of the situation the user wants to achieve tailored to the type of dog and fur.

It is an objective of this invention that the individual tines and other elements of each channel strip will have the loose hair that adheres to the crawler removed on a continuous basis during operation so there is no accumulation of fur in the brush.

It is an objective that skin guards, built into the tines on channel strips, will prevent individual channel strips from injuring the skin of a pet or person.

It is an objective of this invention that medications for prevention or poisoning of ticks, fleas, mites and other such vermin that reside in the animal fur will be dispensed from a container inside or outside the crawler drum head on the crawler handle and then forced through certain tines designed to deliver the chemical past the fur and down to the skin.

It is an objective of this invention coincident with that described above herein with the exception being that the chemical application shall be for the purpose of treating diseases of the skin such as rashes, blisters, bites, sores, psoriasis, and furthermore may also dispense chemicals for moisturizing dry fur or for adding sheen and/or color to the texture of the fur.

It is an objective of this invention to apply all of the objectives stated above for purposes of application to the human condition for human hair. In addition to brushing human hair to remove loose hair, tangles, and bring out the sheen the brush shall dispensed chemicals for various purposes such as applying coloring to the hair. treatment of dandruff, and dry scalp, hair growth products, and application of gels to hold the hair in a set style or permanent after brushing is complete.

It is yet another objective to use this brush as a means of applying sunscreen, sunless tanning lotion, hair epilators, and skin moisturizers directly to the skin. The advantage being greater efficiency in applying chemicals precisely where required with little waste and minimal mess as well as getting these creams and ointments thoroughly rubbed into the skin by the rolling brush tines without having to get the chemicals into the hands.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

PARTS LIST

| | |
|---|---|
| 20 | Pet Brush |
| 22 | Handle |
| 24 | Rotary Head |
| 26 | Tines |
| 28 | Handle Halves |
| 32 | Grip Portion of Handle |
| 34 | Yoke |
| 36 | First End of Yoke |
| 38 | Second End of Yoke |
| 42 | Latch on Yoke |
| 44 | Accumulator |
| 46 | Accumulator Feet |
| 48 | Accumulator Teeth |
| 52 | Fittings in Handle |
| 54 | Electric Motor Assembly |
| 56 | Motor Pivot |
| 58 | Detents on Motor Pivot |
| 62 | Motor Mount |
| 64 | Motor |
| 66 | Motor Drive |
| 68 | Drum Assembly |
| 72 | Sleeve |
| 74 | Drum |
| 76 | First End of Drum |
| 78 | Second End of Drum |
| 82 | Drum Mount |
| 84 | Drum Mount Fitting |
| 86 | End Cap |
| 88 | Opening in End Cap |
| 92 | Internal Grooves Sleeve |
| 94 | Protrusions on Drum |
| 96 | Outer Surface |
| 98 | Channels in Surface |
| 102 | Channel Strips |
| 104 | Anchor |
| 106 | Tines |
| 108 | Skin Guards |
| 112 | Bulb on Skin Guard |
| 114 | Convex Sleeve |
| 116 | Concave Sleeve |
| 118 | Concave Drum Halves |
| 122 | End Caps |
| 124 | Tines with Bristles |
| 126 | J-Shaped Tine |
| 128 | L-Shaped Tine |
| 132 | Concave Anchor |
| 134 | Convex Anchor |
| 136 | Fluid Delivering Brush |
| 138 | Fluid Delivering Head |
| 142 | Fluid Hub |
| 144 | Cut-Out in Fluid Hub |
| 146 | End Cap |
| 148 | Peripheral Fluid Line |
| 152 | Fluid Nozzles |
| 154 | Alt. Head Embodiment |
| 156 | Alt. Head Embodiment |

DETAILED DESCRIPTION OF THE PREFERRED EMBODIMENT

The present disclosure relates to a rotary brush for use in grooming a pet, such as a dog or cat. The brush includes a handle to which a head is rotatably mounted. The head preferably includes a series of channels that accepted elongated rows of tines. The tines can be formed in any of a variety of shapes or arrangements to facilitate proper grooming. A skin guard can also be included to prevent the tines from damaging the pet's skin. An accumulator is secured to the handle and is interdigitated with the series of upstanding tines. In this manner, the accumulator collects hair gathered by the tines. The various features of the present invention, and the manner in which they interrelate, will be described in greater detail hereinafter.

Figure 1:
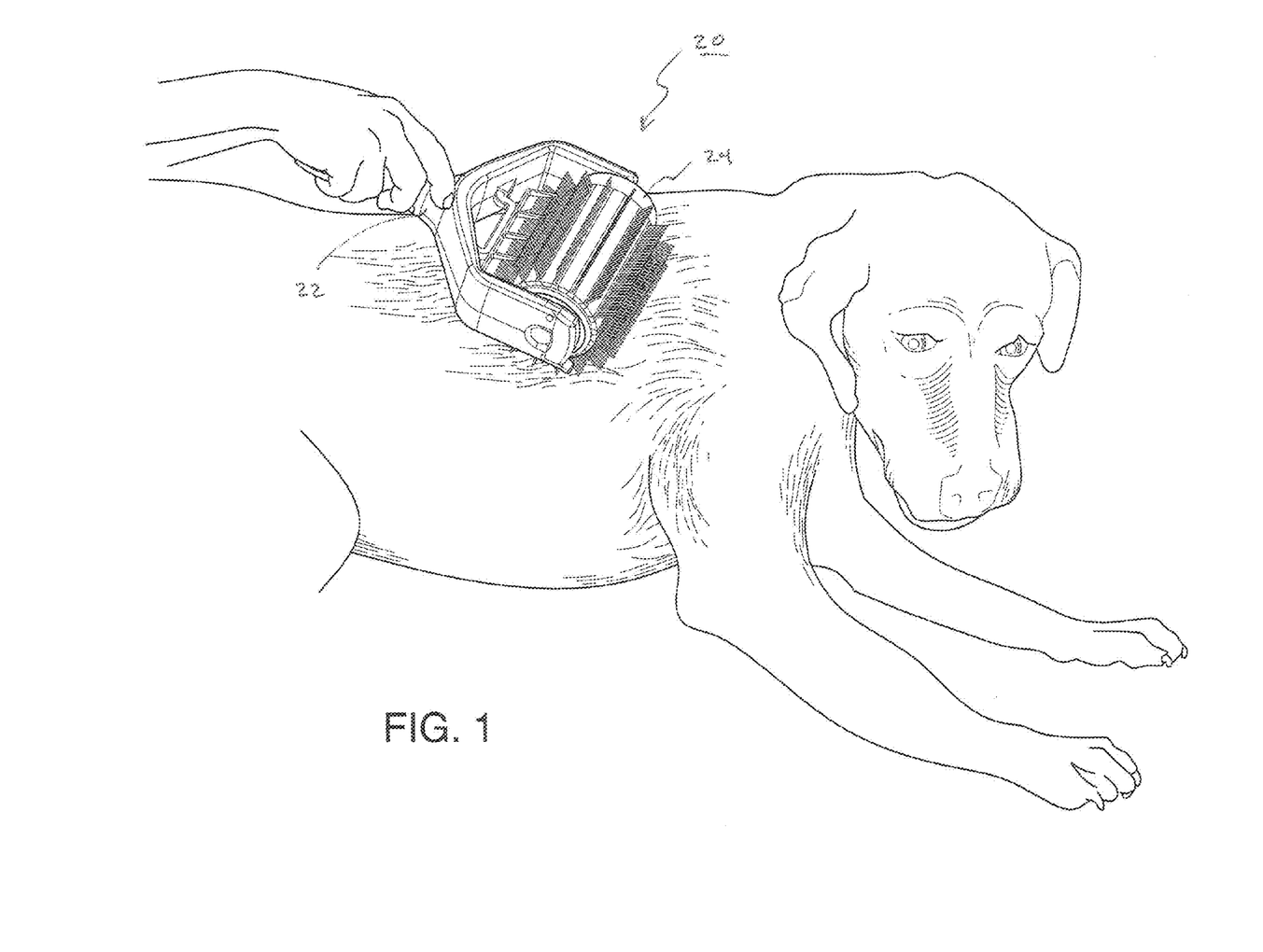
FIG. 1 is a view of the pet brush in use upon a dog.

FIG. 1 is an illustration of the pet brush 20 being used to groom a dog. Brush 20 generally includes a handle 22 and a rotary head 24 with a series of tines 26. Brush 20 can be connected to an outlet, or other suitable source of 110 VAC, via an electrical cord to power an associated electric motor. In the alternative, the motor can be battery powered. The motor rotates head 24 to permit tines 26 to collect and groom fur. It is preferred that brush 20 be moved across the pet in the same direction as the rotation of head 24. Handle 22 of can include both a power switch as well as a switch to chose the direction in which head 24 rotates.

Figure 8:
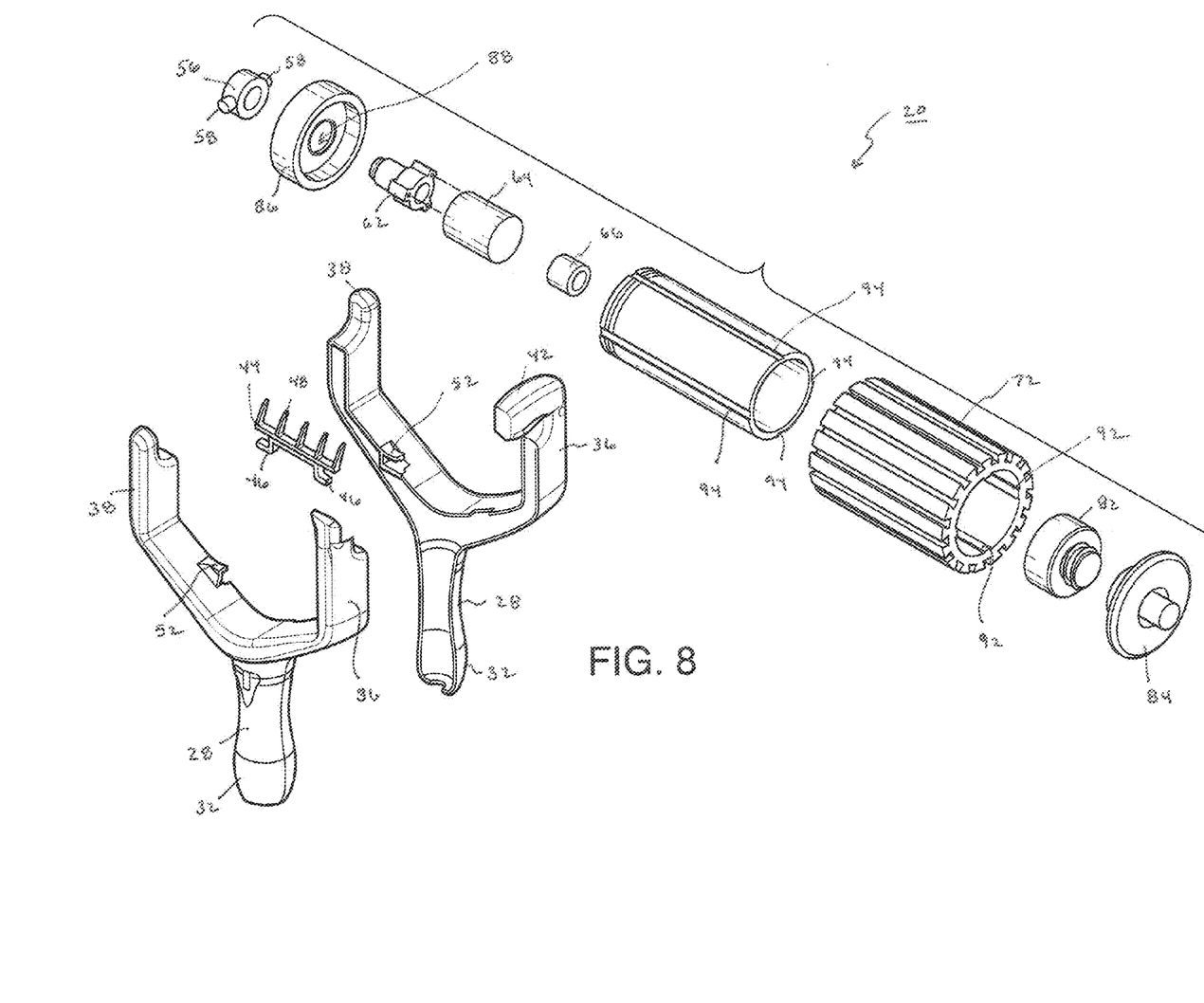
FIG. 8 is an exploded view of the pet brush.

As illustrated in the exploded view of FIG. 8, the handle can be formed from two interconnecting halves 28. Halves 28 can be fitted together via a snap fit interconnection. Once assembled, handle 22 is generally defined by a lower grip portion 32 and an upstanding yoke 34. Yoke 34, in turn, includes first and second ends (36 and 38). The first end 36 of yoke 34 includes a pivotal latch 42 that is used in lockingly receiving a drum mount. The second end 38 preferably includes opposing recesses for receiving a motor pivot. Both these interconnections are described in greater detail hereinafter.

Figure 2:
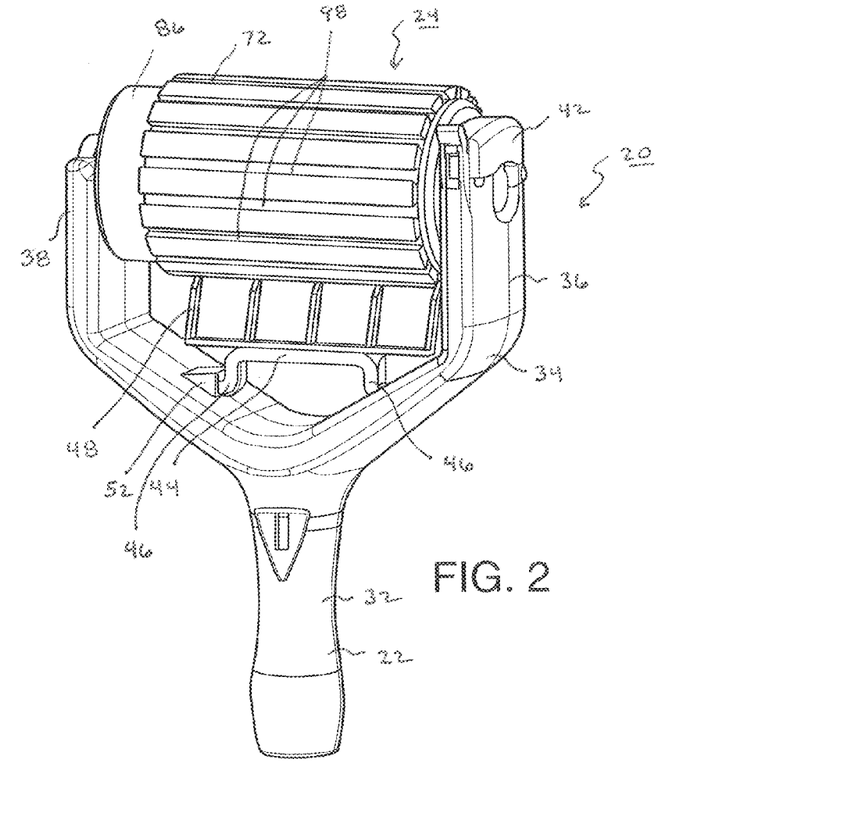
FIG. 2 is a perspective view of the pet brush.
Figure 4:
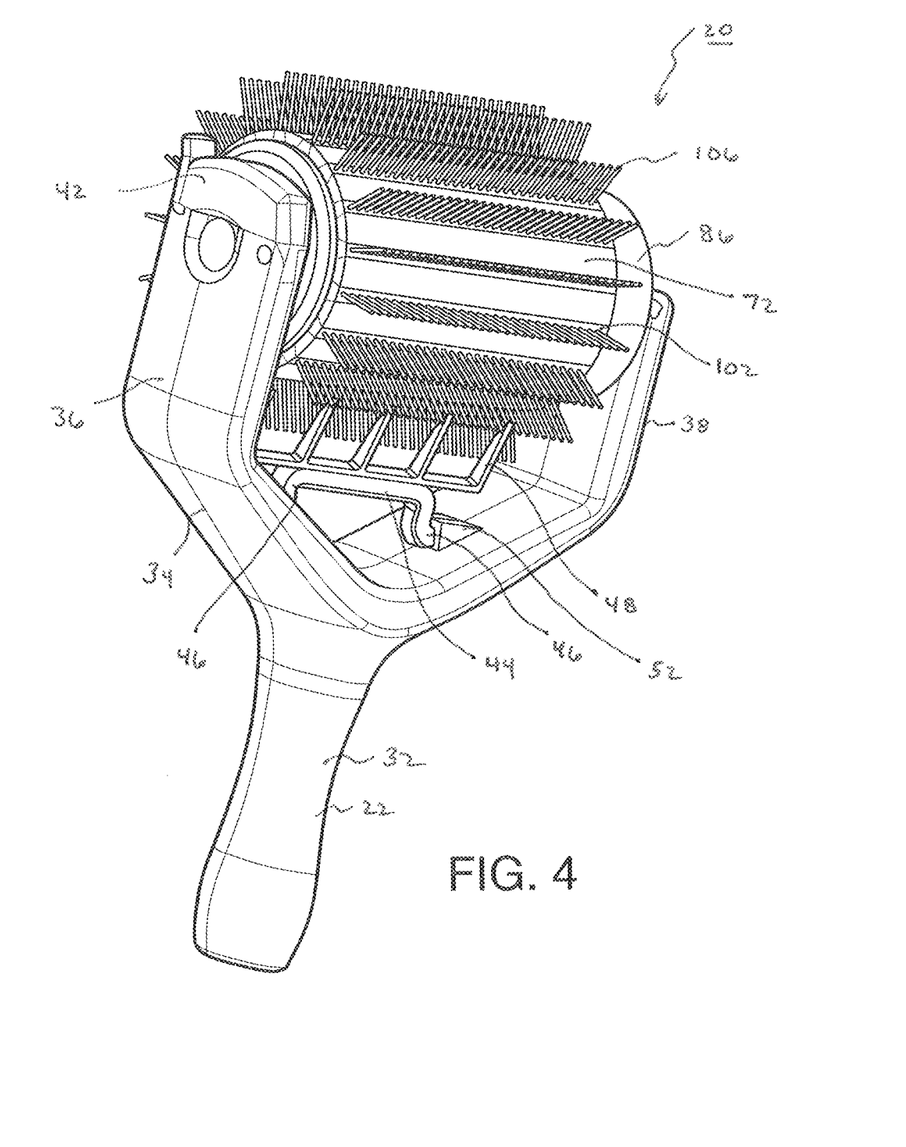
FIG. 4 is a perspective view of the pet brush showing the accumulator interdigitated with the tines of the sleeve.
Figure 5:
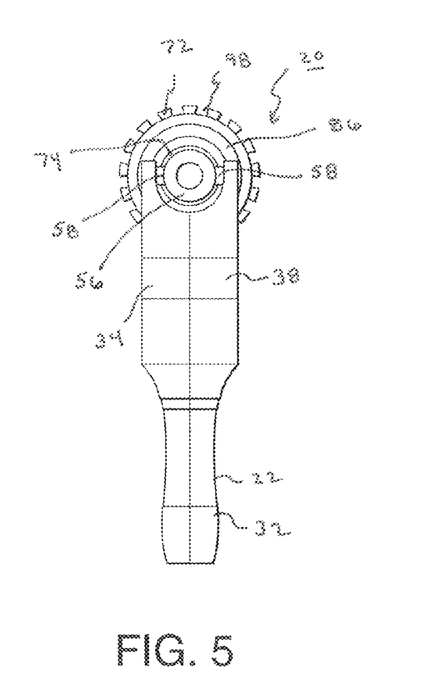
FIG. 5 is a side elevational view of the pet brush showing the second end of the handle yoke.
Figure 6:
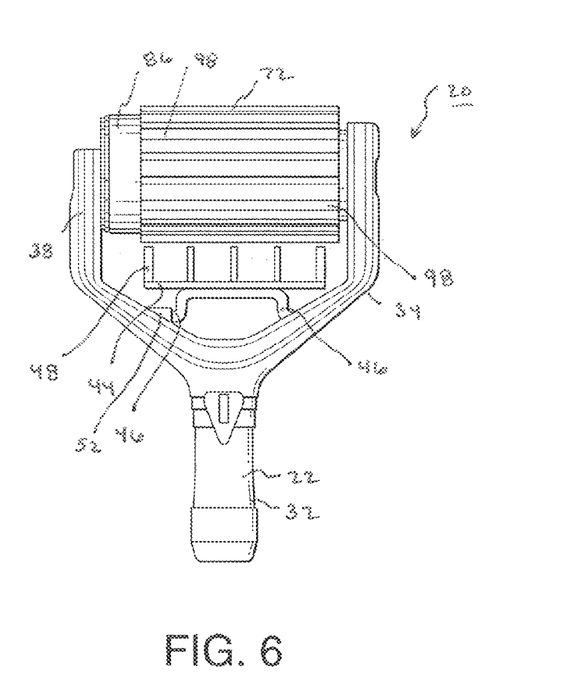
FIG. 6 is a front elevational view of the pet brush.
Figure 7:
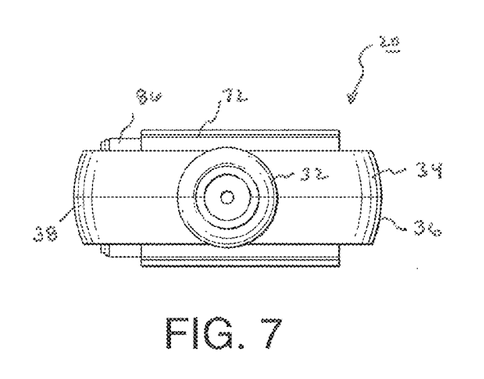
FIG. 7 is a bottom plan view of the pet brush.

The accumulator 44 is described next with particular reference to FIGS. 2 and 4. In the preferred embodiment, accumulator 44 includes a pair of lower feet 46 and a series of upstanding teeth 48. Feet 46 are adapted to be positioned between opposing fittings 52 within the interconnecting halves 28 of handle 22. Thus, with the two halves 28 of handle 22 lockingly interconnected, accumulator 44 is fixed with respect to handle 22.

As illustrated, when mounted to handle 22, the upstanding teeth 38 of accumulator 44 are positioned between the first and second ends (36 and 38) of yoke 34. It is preferred that teeth 48 are slightly inclined with respect to the longitudinal axis of handle 22. Although the depicted embodiment utilizes five teeth 48, different numbers of teeth can likewise be used. Teeth 48 are preferably long enough so they are in close proximity to the face of the rotating head 24. This permits teeth 48 to be interdigitated and mesh with the tines 26 upon head 24. In this manner, teeth 48 collect hair gathered by tines 26.

Head 24 is preferably driven by an electric motor assembly 54 positioned within the interior of head 24. One suitable motor assembly 54 is depicted in the exploded view of FIG. 8. This assembly 54 includes a motor pivot 56 that is secured to the second end 38 of yoke 34. More specifically, motor pivot 56 includes opposing detents 58 that fit into apertures formed within the second end 38 of yoke 34. This arrangement permits the motor assembly 54 to pivot with respect to yoke 34. This pivoting is needed to change the tines 26 on head 24 or otherwise service motor assembly 54.

Motor assembly 54 also includes a motor mount 62 that is fixedly secured via a threaded connection to motor pivot 54. Motor mount 62, in turn, is secured to the motor 64 and a motor drive 66. The individual components of motor assembly 54 are arranged and secured such that the motor drive 66 rotates with respect to handle 22.

Motor assembly 54 drives both a drum assembly 68 and a sleeve 72. With continuing reference to FIG. 8, a drum 74 is positioned over the motor mount 62, motor, 64 and motor drive 66. Drum 74 is defined by first and second ends (76 and 78). A drum mount 82 is secured, via an adhesive, into the first end 76 of drum 74 and rotatably mounts the first end 76 of drum 74 to the first end 36 of yoke 34. More specifically, drum mount 82 includes a circular fitting 84 that is secured via latch 42 on yoke 34. Fitting 84 secures the drum mount 82 without precluding rotational movement. The drum assembly 68 further includes an end cap 86 secured to the second end 78 of drum 74.

End cap 86 is preferably threadably secured to second end 78 of drum 74. As such, end cap 86 secures both motor mount 62 and motor 64 within the interior of drum 74. End cap 86 includes a central opening 88 that permits end cap 86 to be rotatably positioned over motor mount 62. As illustrated in FIG. 2, once assembled, end cap 86 rotates along with drum 74 and is positioned adjacent the inside of the second end 38 of yoke 34.

Sleeve 72 is lockingly received over drum 74. In the depicted embodiment, sleeve 72 includes grooves (or protrusions) 92 along its interior surface that mate with corresponding protrusions (or grooves) 94 on the exterior surface of drum 74. In this fashion, drum and sleeve (74 and 72) rotate as a unit with respect to handle 22. Sleeve also includes an outer surface 96 with a series of longitudinally formed channels 98. These channels 98 are adapted to receive a series of channel strips 102 as described below.

Figure 3:
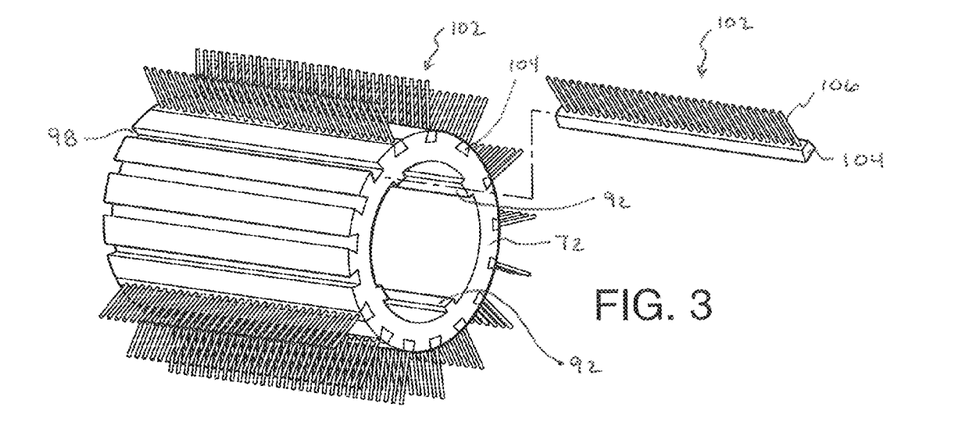
FIG. 3 is a perspective view of the sleeve with removable channel strips.

FIG. 3 illustrates a channel strip 102 being inserted into a channel 98 in sleeve 74. Sleeve 72 preferably includes a series of equally spaced channels 98 for receiving an equal number of channel strips 102. In the depicted embodiment, a total of 24 channel strips 102 are inserted into evenly spaced channels 98 about the outer surface 96 of sleeve 74. As such the total number of channel strips 102 corresponds to the number of longitudinal channels 98 formed within the surface 98 of sleeve 74. Each channel strip 102 includes a lower anchor 104 and a series of upstanding tines 106 of a first height. Each channel strip 102 further includes one or more skin guards 108, with each skin guard 108 having a height that is greater than the height of tines 106. The skin guards 108 preferably terminate in a rounded bulb 112. The anchor 104 of each channel strip 102 is removably positioned within a corresponding longitudinal channel 98 within sleeve 72. Tines 106 are designed for hair or vermin removal, with the guards 108 preventing tines 106 from scraping or otherwise damaging the skin of the pet being groomed.

In use, the user can install a series of channel strips 102 into the channels 98 of a sleeve 72. These channel strips 102 can include particular tines 106 and tine configurations depending upon the nature of the grooming being performed. For instance, tines 106 can have different shapes or textures can be formed from varying materials depending upon whether the animal is being groomed for flea removal, hair removal, or simply combing. Once channel strips 102 are installed, sleeve 72 is inserted over drum 74. In order to accomplish, latch 72 is opened to permit drum 74 and interior motor 64 to be pivoted upwardly amount motor pivot 56. In this orientation, a sleeve 72 and be taken off or inserted over drum 74. Once a sleeve 72 is secured, the assembly can be pivoted back down and locked via the yoke latch 42.

Figure 9:
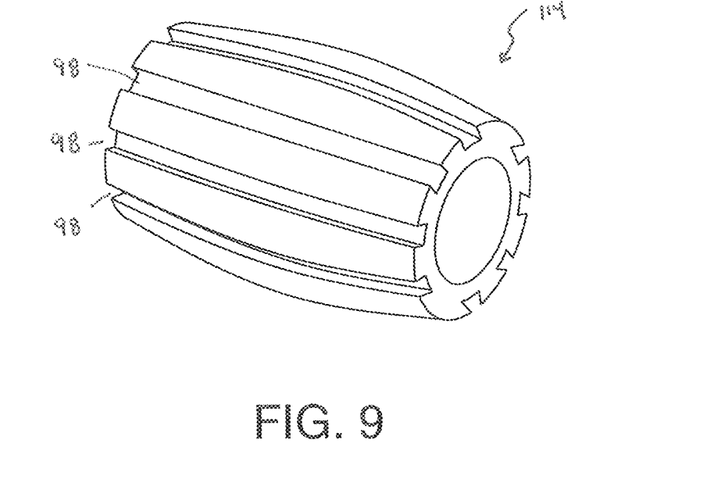
FIG. 9 is a view of an alternative convex rotary sleeve for use with the pet brush.
Figure 10:
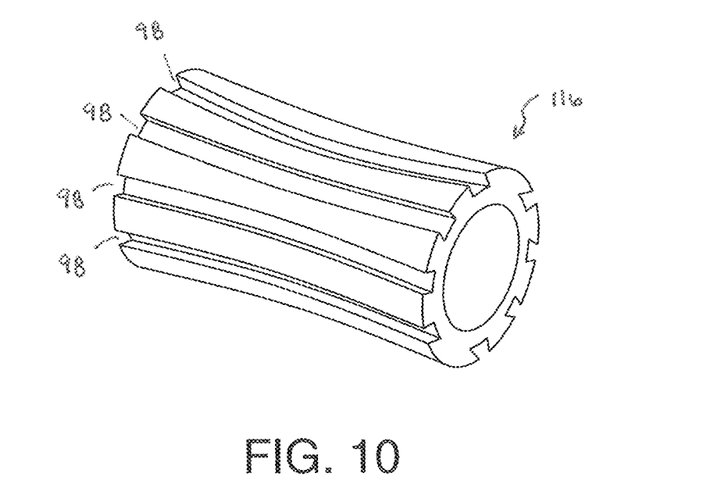
FIG. 10 is a view of an alternative concave rotary sleeve for use with the pet brush.

Alternative designs to the above described sleeve 72 can also be employed. As noted in FIG. 9, a convex sleeve 114 can be used, and, as noted in FIG. 10, a concave sleeve 116 can be used. The convex or concave shape being determined relative to the axis of rotation. These shapes can be advantageously used to groom pets in difficult to reach areas. For instance, the convex sleeve 114 can be used on an animal's stomach, and the concave sleeve 116 can be used on the tail of an animal. Both the convex and concave sleeves (114 and 116) similarly include longitudinally formed channels for receiving a series of channel strips. The anchor portions 104 of the channel strips 102 can be formed from a flexible material such that the channel strip 102 can be bent to follow the convex or concave contours of the sleeve (114 or 116).

Figure 11:
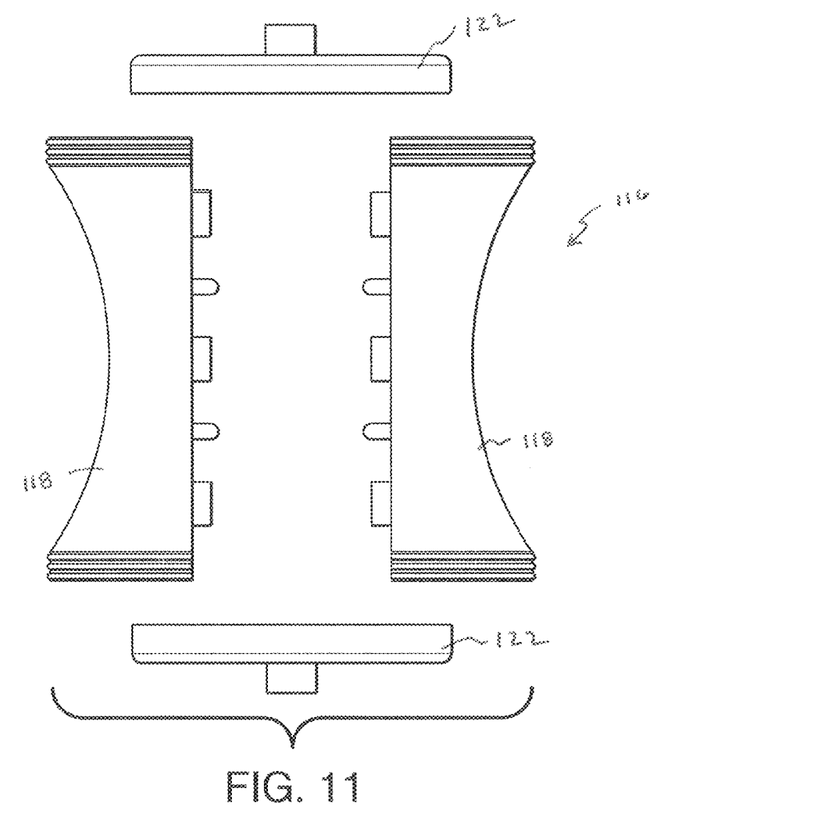
FIG. 11 is an exploded view of the concave rotary sleeve for use with the pet brush.
Figure 12:
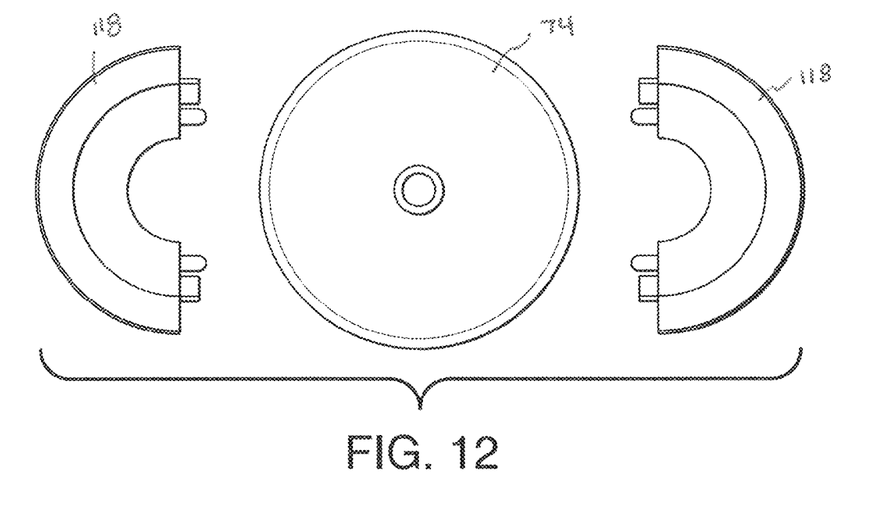
FIG. 12 is a side exploded view of the concave rotary sleeve for use with the pet brush.
Figure 13A:
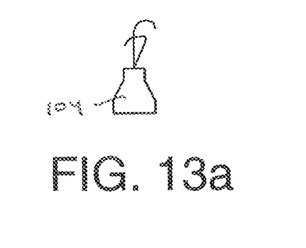
FIG. 13(a)-(b) are views of a linear channel strip for use with the pet brush.
Figure 13B:
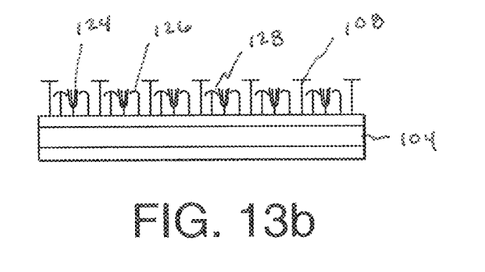
Figure 14A:
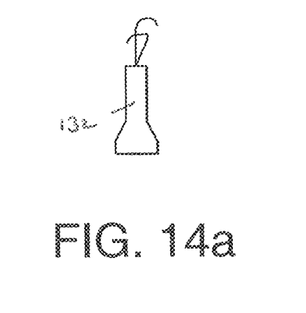
FIG. 14(a)-14(b) are views of a concave channel strip for use with the pet brush.
Figure 14B:
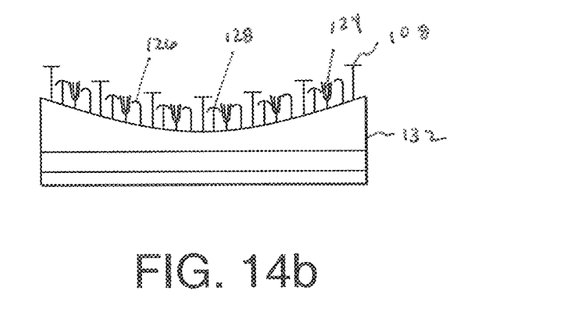
Figure 15A:
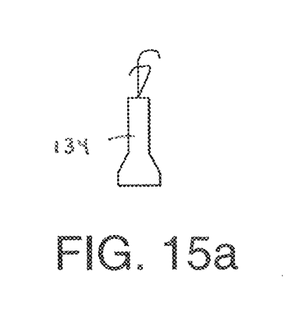
FIG. 15(a)-15(b) are views of a convex channel strip for use with the pet brush.
Figure 15B:
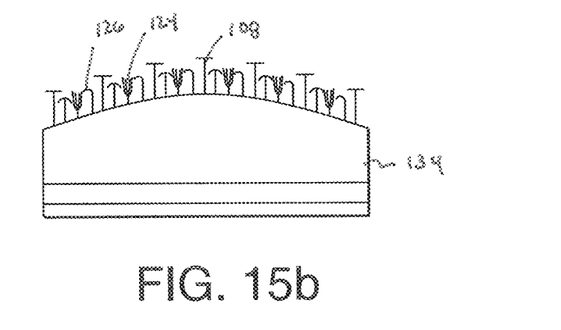
Figure 16A:
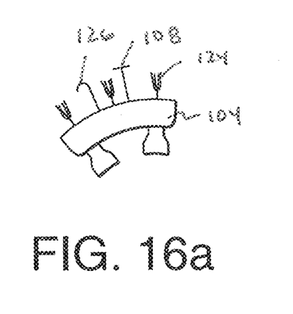
FIG. 16(a)-16(b) are views of a wide channel strip for use with the pet brush.
Figure 16B:
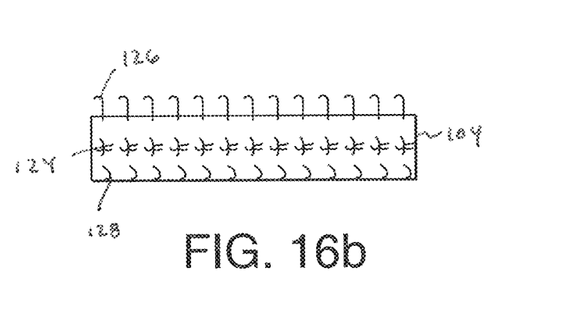

FIGS. 11 and 12 contain details regarding how the concave sleeve 116 is fitted over the corresponding drum 74. More specifically, due to the inwardly sloped periphery, sleeve 116 cannot be inserted over the cylindrically shaped drum 74. Rather, the sleeve 116 is formed from two mating haves 118 that are secured above opposite sides of drum 74. Detents and slots can be formed on mating halves of sleeve 116 to lockingly engage the two halves 118. Threaded end caps 122 can be secured over drum 74 and sleeve 116 to complete the assembly.

There are numerous alternative embodiments for the channel strips and the associated tines and guards. In one embodiment, channel strip 102 includes tines 124 with a number of upstanding bristles. These bristles can be arranged in a broom type pattern. In another embodiment, the tines include an uppermost end that is "J" shaped 126. In yet another embodiment, the tine has an uppermost end that is "L" shaped 128. Elongated skin guards 108 can be spaced between the broom shaped, J-shaped, or L-shaped tines (124, 126, 128). As noted above, the skin guards 108 are preferably taller than the tines (124, 126, 128) and terminate in a bulbous end 112. This bulbous end 112 is designed to contact the skin of the animal without scraping or otherwise penetrating the skin. The guards 108 also prevent the surrounding tines (124, 126, or 128) from making contact with the skin.

In still yet other embodiments, the channel strip anchors can have a concave or convex shape (132, 134). These convex and concave channel strips (132, 134) can be used upon a cylindrical sleeve 72 or upon a convex or concave sleeve (114, 116). By selecting different channel strips with differing anchors (104, 132, 134) for differing sleeves (72, 114, 116), a wide variety of brush configurations can be achieved. The channel strip 102 can also be extra wide such that it spans multiple channels 98 upon the sleeve 72. In this embodiment, the channel strip includes two anchors 104 that are inserted into different channels 98 about the periphery of sleeve 72. Namely, a single channel strip 102 can be wide enough to span multiple channels 98.

Figure 17:
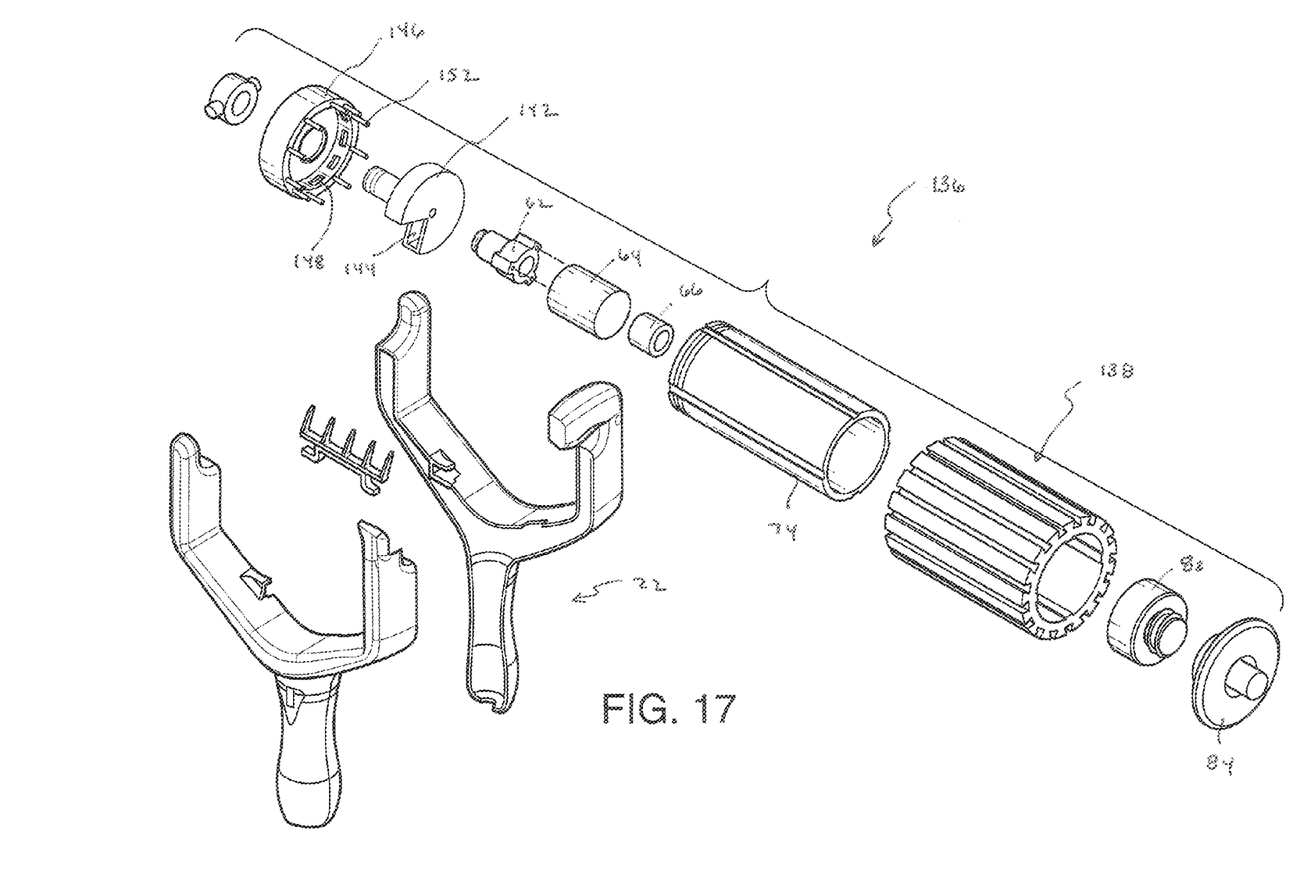
FIG. 17 is an exploded view of an alternative embodiment wherein a fluid is dispensed into the rotary sleeve.

In a further alternative embodiment, a modified brush 136 is provided wherein the rotary head 138 delivers fluids, such as water, medicine, or grooming products to the fur of the animal. This is accomplished by providing a tube within the interior of the handle that routes fluids to a fluid hub 142. Hub 142 is secured to the second end 38 of yoke 34 and includes a cut-out 144 that directs the fluid towards the forward face of brush 136. Hub 144 is positioned within the end cap 146 of the drum. The end cap 146 is modified to provide a peripheral fluid distribution line 148 and a series of fluid nozzles 152. These nozzles 152 are oriented to be aligned with the channels 98 formed within sleeve 72. Because the hub 142 is fixed and the end cap 146 rotates, water will be sequentially delivered to different fluid nozzles 152 as the rotary head 138 travels along the surface of an animal. As such, the fluid is only delivered to the surface being groomed. This also prevents the user from getting sprayed as the fluid is being applied to the animal.

Figure 18:
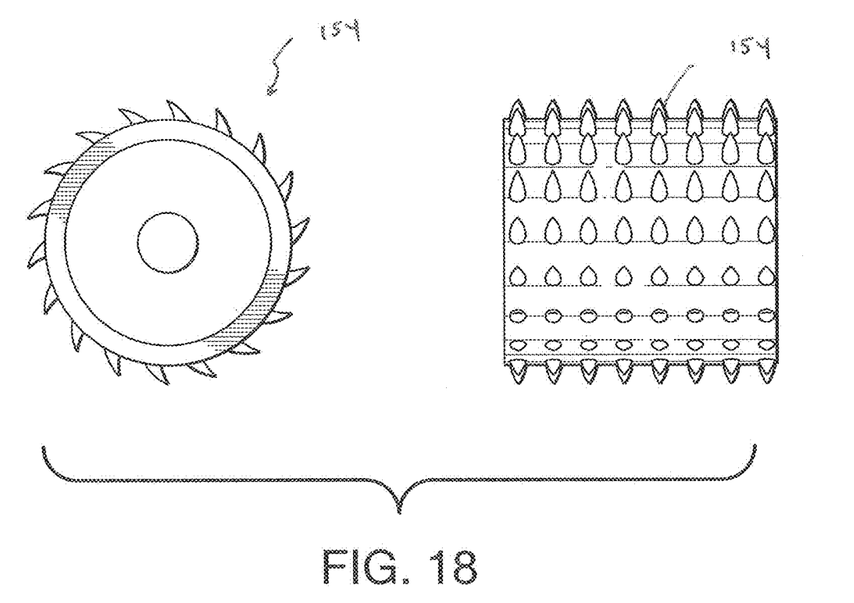
FIG. 18 is a view of an alternative sleeve for use with the pet brush.
Figure 19:
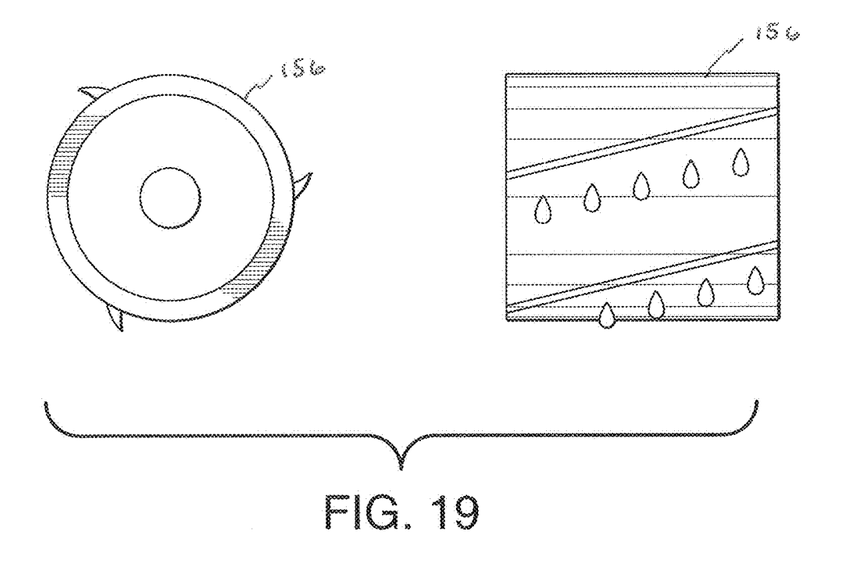
FIG. 19 is a view of an alternative sleeve for use with the pet brush.
Figure 20:
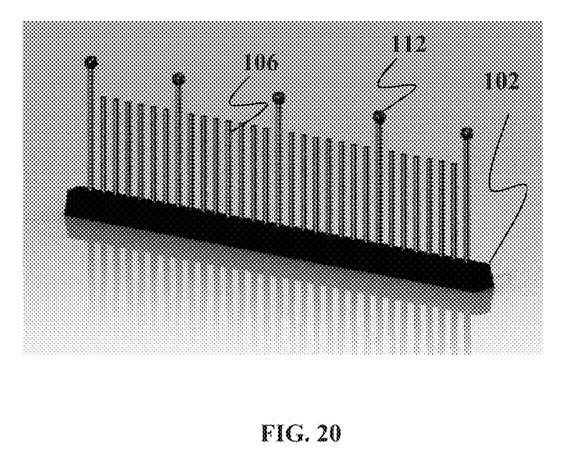
FIGS. 20-25 are various alternative embodiments for the channel strips, tines, and skin guards.
Figure 21:
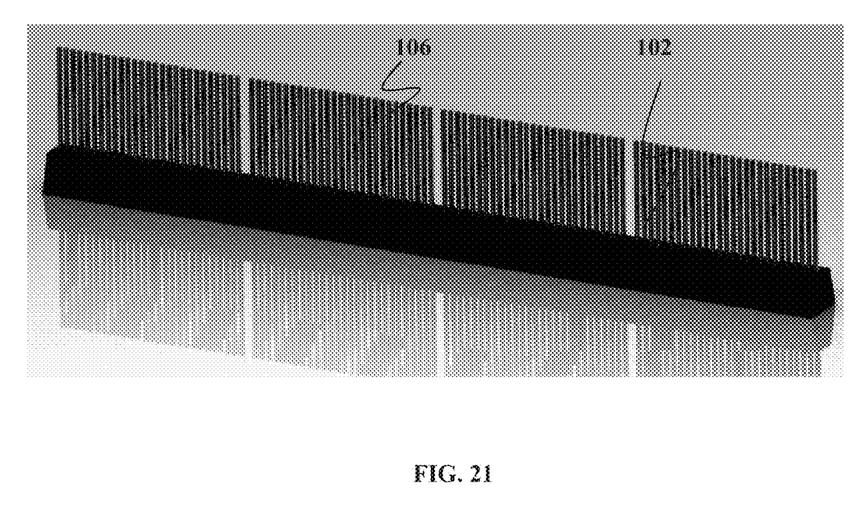
Figure 22:
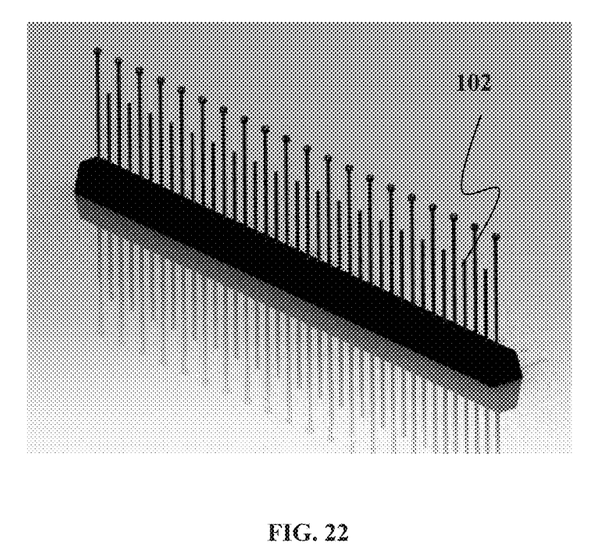
Figure 23:
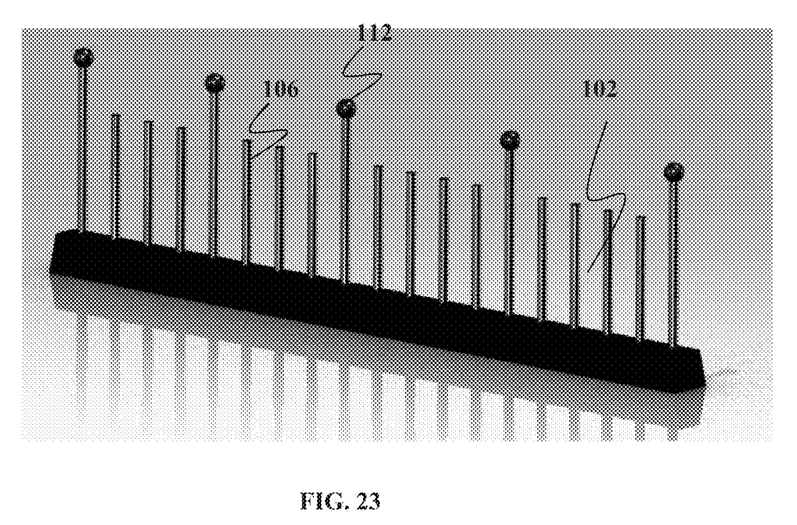
Figure 24:
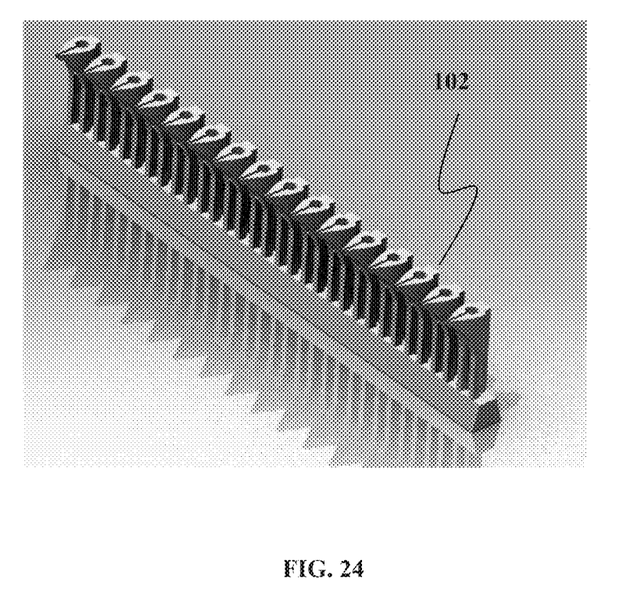
Figure 25:
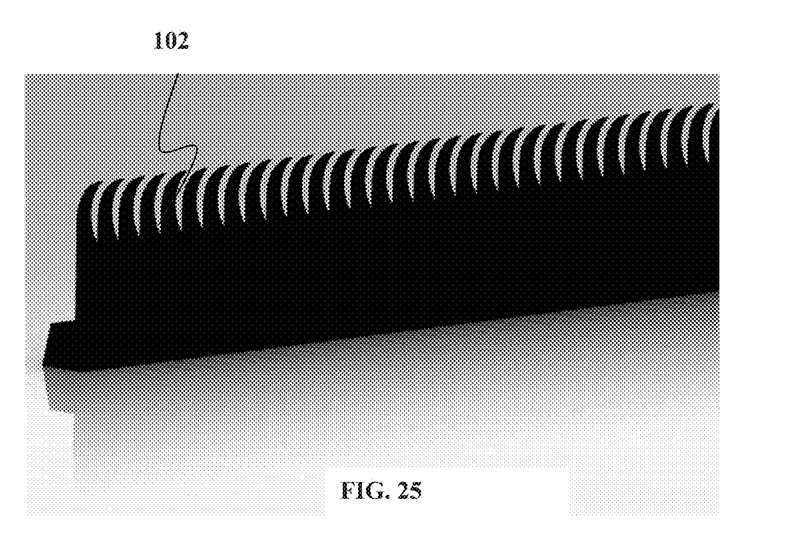

The sleeve can be further modified to facilitate more targeted application of the fluid. FIGS. 18 and 19 show additional drums that have special finished surface textures. FIG. 18 shows a drum 154 with coarse semi-rigid drum with holes for water or chemicals to pass through. FIG. 19 shows a drum 156 that has holes for chemicals, creams or moisturizers on thin rubber type blades for spreading the liquid over the skin.

FIGS. 20-25 illustrate various alternative embodiments for the channel strips 102. Each of these strips 102 includes a lower anchor 104 adapted for insertion into a sleeve. However, the tines 106 and skin guards 108 have been modified to achieve specific grooming objectives and to remove fleas, ticks and other vermin.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A rotary brush for use by an operator upon an animal, the rotary brush comprising:
   a handle formed from two interconnecting halves, the handle including a lower grip portion and an upstanding yoke with first and second ends, the first end including a pivotal latch;
   an electric motor assembly including a motor pivot secured to the second end of the yoke, the motor pivot being secured to a motor mount and a motor, the motor assembly capable of generating rotational forces relative to one of the yokes;
   a drum assembly including a cylindrical drum positioned over the motor, the drum having first and second ends, a drum mount secured to the first end of the drum and rotatably mounting the first end of the drum to the first end of the yoke, the drum assembly further including an end cap secured to the second end of the drum, the end cap rotatably positioned over the motor mount and adjacent the second end of the yoke;
   a removable sleeve having a cylindrical in shape, the removable sleeve lockingly received over the cylindrical drum and the motor, whereby rotation of the motor assembly causes the simultaneous rotation of the drum and the sleeve with respect to yoke, the sleeve including an outer surface with a series of longitudinally formed channels, the motor pivot allowing the sleeve to be pivoted relative to the yoke for removal by the operator;
   a series of channel strips, with the number of channel strips corresponding to the number of longitudinal channels formed within the surface of the sleeve, each channel strip including a lower anchor and a series of upstanding tines of a first height, each channel strip further including one or more skin guards, with each skin guard having a height that is greater than the height of the tines and terminating in a rounded bulb, the anchor of each channel strip being removably positioned within a corresponding longitudinal channel within the sleeve.

2. A rotary brush for use upon an animal, the rotary brush comprising:
   a handle including a grip portion and first and second upstanding ends;
   a pivotal latch included on the first upstanding end and a motor pivot included on the second upstanding end;
   a motor and a motor mount interconnected to the motor pivot, whereby the motor is capable of rotation relative to the handle;
   a cylindrical drum positioned over the motor, and rotatably connected between the first and second upstanding ends of the handle;
   a removable, cylindrical sleeve lockingly received over the drum and the motor, whereby rotation of the motor causes the simultaneous rotation of the drum and the sleeve with respect to handle;
   the motor pivot allowing the motor and the sleeve to be pivoted with respect to the handle so that a user can remove the sleeve;
   the sleeve including an outer surface with a series of longitudinally formed channels;
   a series of channel strips with the number of channel strips corresponding to the number of longitudinal channels formed within the surface of the sleeve.

3. The rotary brush as described in claim 2 wherein each channel strip includes a lower anchor and a series of upstanding tines of a first height.

4. The rotary brush as described in claim 3 wherein the anchor of each channel strip is removably positioned within a corresponding longitudinal channel within the sleeve.

5. The rotary brush as described in claim 3 wherein each channel strip further includes one or more skin guards, with each skin guard having a height that is greater than the height of the tines.

6. The rotary brush as described in claim 5 wherein each skin guard terminates in a rounded bulb.

7. The rotary brush as described in claim 2 further comprising an accumulator secured to the handle.

8. The rotary brush as described in claim 2 further comprising an accumulator secured to the handle, wherein the accumulator includes a series of upstanding teeth.

9. A rotary brush comprising:
   a handle including a grip portion and first and second upper ends;
   a motor capable of rotation relative to the handle;
   a cylindrical drum rotatably connected between the first and second upper ends of handle, the drum being driven by the motor;
   a removable cylindrical sleeve positioned over the drum and the motor, whereby rotation of the motor causes the simultaneous rotation of the drum and the sleeve with respect to handle;

a motor pivot and a motor mount at the first upper end of the handle for allowing the motor and the sleeve to be pivoted with respect to the handle so that a user can remove the sleeve;

a pivotal latch at the second upper end of the handle for releasably securing the cylindrical drum.

10. The rotary brush as described in claim 9 wherein the sleeve includes a series of channels formed within its outer face.

11. The rotary brush as described in claim 10 wherein a series of tines are slidingly received within the channels.

12. The rotary brush as described in claim 11 wherein a row of tines are supported by an anchor and wherein the anchor is slidably received within one of the channels.

13. The rotary brush as described in claim 12 wherein different shaped tines are included on a single anchor.

* * * * *